United States Patent Office 3,450,312
Patented June 17, 1969

3,450,312
METHOD AND INSTALLATION FOR THE AUTOMATIC FEEDING OF FIBRES INTO MACHINES FOR PROCESSING FIBRE MATERIAL
Gerard Benoni Boucherie, Potaardestraat 1, Rumbeke, Belgium
Filed July 6, 1967, Ser. No. 651,494
Claims priority, application Belgium, Oct. 20, 1966, 46,155, Patent 688,532; Dec. 30, 1966, 46,377, Patent 691,981
Int. Cl. G01f *11/14;* B65h *3/66;* A46d *1/08*
U.S. Cl. 222—363                      32 Claims

ABSTRACT OF THE DISCLOSURE

Method for the automatic supply of fibres to a fibre material processing machine, consisting in successively picking small amount of fibres from a supply mass of fibres, in conveying each small amounts of fibres, under constant pressure toward a bundle separator which feeds a fibre processing machine. Installation applying said method.

---

The present invention concerns a method and an installation for automatically filling and feeding fibres into a production machinery for processing fibre material, i.e., machines operating in such way that successive small bundles of fibres are taken from a stock of bundles in order to be subsequently treated bundle by bundle.

Several machines are known which successively form bundles.

One example of such a machine for treating small bundles of fibre is for instance a brushmaking machine whereby, until now, the fibres are piled up in a magazine and whereby said fibres which have thus been piled-up are subjected to a more or less uniform pressure obtained for instance by putting weights or the like onto the stock of fibres and whereby a distribution mechanism provides that for each hole of a brush body to be filled with fibres, a bundle of the latter is taken from aforesaid magazine in order to be moved toward the filling tool which plants aforesaid bundle of fibres into the brush body and fastens it to the latter.

Filling aforesaid magazine, especially in the case of heavier fibres, requires the permanent presence of an operator with the machine, whereby this person must continuously or almost continuously go on filling aforesaid magazine in order to follow the production rate.

The object of the present invention is a method and a device for carrying out this method by means of which the supply of fibres and more especially of fibre bundles is carried out automatically by constantly filling said magazine, known as such, with fibres taken from a main magazine or main storage place containing a comparatively large amount of fibres, so that the contribution of aforesaid operator may be reduced to a minimum, so that one and the same person can operate several machines and even carry out other duties at the same time.

The method according to the present invention by means of which aforesaid advantages can be obtained, as well as further advantages too, mainly consists in the fact that the process starts with a comparatively substantial amount of fibres for the further feed of the machine; that aforesaid fibres are taken away in smaller amounts by the action of gravity and that said smaller amounts of fibres are moved toward a bundle separator which is itself feeding the fibre processing machine, whereby these smaller units are constantly kept under pressure.

The present invention also concerns a device which applies aforesaid method, whereby such device mainly consists in the combination of a main magazine in which a considerable amount of fibres is provided, a discharge magazine which on the one hand issues from the lower part of aforesaid main magazine and on the other hand is connected with a magazine which in turn leads into a bundle separator and cooperates with aforesaid magazines as well as means which take successively smaller amounts of fibres from the main magazine toward the bundle separator.

In order to give a fuller explanation of the present invention, a description is given below, without implying any limiting feature however, of a few preferred modes of embodiment of devices for automatically feeding fibre processing machines with fibres. This description refers to the appended drawings of which.

Figure 1:
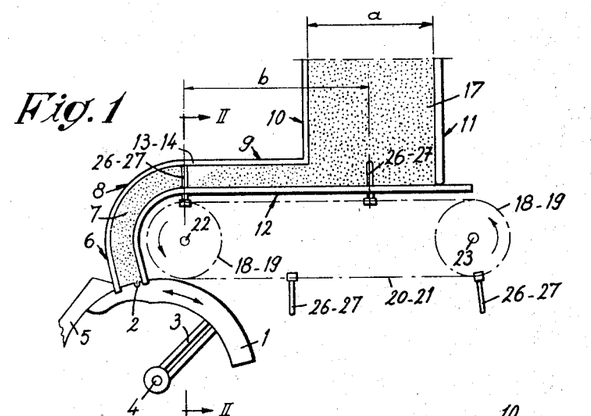
FIGURE 1 is a diagrammatic side view of a device for automatically filling, respectively feeding, the magazine of fibre processing machines.
Figure 2:
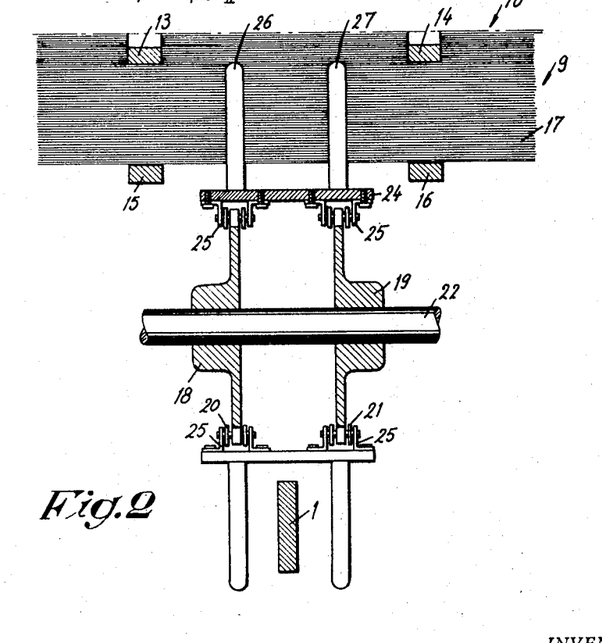
FIGURE 2 is a diagrammatic cross-section by a plane of which the trace follows stright line II—II of FIGURE 1.

The device as illustrated in FIGURES 1 and 2 mainly consists of a bundle separator 1, known as such, but which in this case is curved and provided at a given place with an appropriate recess 2 of which the size determines the importance of the fibre bundles which are successively to be processed, whereby this bundle separator is fastened onto an arm 3 which in turn is mounted on an axis 4. Above said separator 1 which has thus been formed, a counterpart has been provided along which that bundle separator can move in order to convey the bundle of fibres which has been carried away, toward a (nonrepresented) fibre processing machine or the like.

Above the bundle separator 1, there is a magazine 6 filled with fibres 7 which are all arranged parallel to aforesaid axis 4.

Said bundle separator 1, as well as the magazine 6 placed on top of it, are known as such. There are some other devices for separating bundles of fibre, which are for instance straight but all of which are combined with a small magazine 6 which must permanently be filled by an operator.

According to the present invention, aforesaid magazine 6 extends into a curved part 8 which in turn extends into a horizontal part 9 and whereby the latter leads into a main magazine 10 of which at least one wall, such as wall 11 for instance, is adjustable.

In this case, the bottom wall 12, of the horizontal magazine 9 is extended under the main magazine 10, whereby the walls of the magazines 6, 8, 9 and 10 are adjustable with respect to each other by pairs according to the length of the fibres to be processed 17.

Under the magazines 9 and 10, two pairs of sprocket wheels 18 and 19 respectively have been mounted and are connected to each other by means of chains 20 and 21 respectively.

Finally, said sprocket wheels 18 and 19 are each fastened onto a shaft 22 and 23 respectively.

Aforesaid chains 20 and 21 are moreover connected to each other at equally spaced intervals by bridges 24 fastened to special links 26 provided for the purpose on said chains 20 and 21. On each one of the bridges 24 there are two fingers 26 and 27 respectively, whereby said fingers lay at a distance apart which is always larger than the thickness of aforesaid bundle separator 1 and whereby the length of aforesaid fingers 26–27 is adjusted in such way that the free ends of said fingers lay evenly on projections over the underside of aforesaid laths 13 and 14.

The operation of the device illustrated by FIGURES 1 and 2 is very simple and as follows:

A comparatively large mass of fibres 17 is put into the main magazine 10, such for instance as the amount which is required for a full day's operation with this device.

The sprocket chains 20 and 21 are driven by a (nonrepresented) appropriate motor via the shafts 22 and 23, whereby the fingers 26–27 move through the mass of fibres contained in the main magazine 10 and pick up the bottom part of these fibres in order to transfer them into magazine 9. Subsequently, the fibres 17 which have thus been carried away are replaced behind aforesaid fingers by a further amount which automatically drop onto the laths 15–16 while the masses of fibres which have been carried away are conveyed along the curved magazine 8 into magazine 6. At this moment, the fingers 26–27 exert a well defined constant pressure onto the mass of fibres contained in said magazine 6, by the mere constant transport thereof via the chains 20 and 21, on account of which aforesaid recess 2 is filled each time with an approximately equal amount of fibres on account of the swinging motion of the fibre separator 1.

It is obvious that the width $a$ of the main magazine 10 is to be adjusted in such may by displacement of the wall 11 with respect to the distance $b$ between the fingers and simultaneously with respect to the kind of fibres to be processed, that the space between two pairs of fingers 26–27 and the laths 13 to 16 is always completely filled in order to obtain a constant pressure of said fibres against the fibre separator 1.

For processing some fibres it is necessary for obtaining a correct filling of aforesaid recess 2, that the fibres be displaced by a finger which presses on these fibres in the middle of their length.

In this case, aforesaid fingers lay in the trajectory of the fibre separator 1 in such way that they must be pulled away in the appropriate way and in due time in order to avoid breaking any parts of the machine.

In the mode of embodiment illustrated in FIGURES 3 to 9, such a device is given by way of example.

Figure 3:
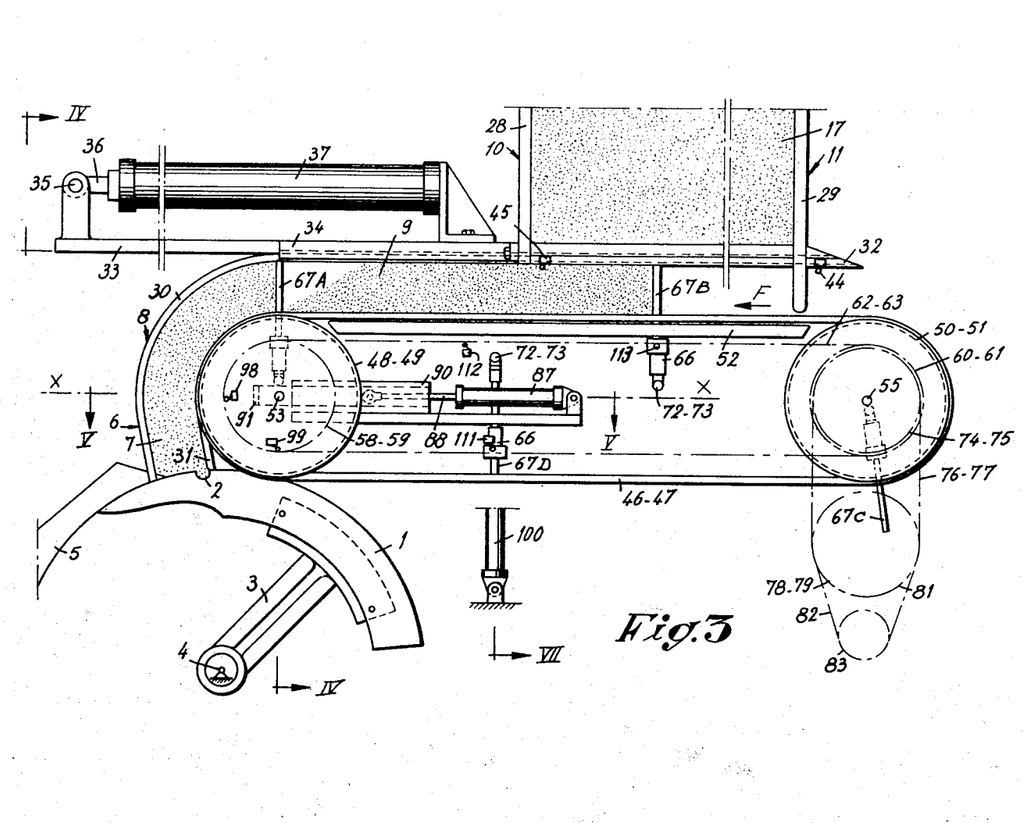
FIGURE 3 illustrates a side view of a variant of the type according to FIGURE 1.
Figure 4:
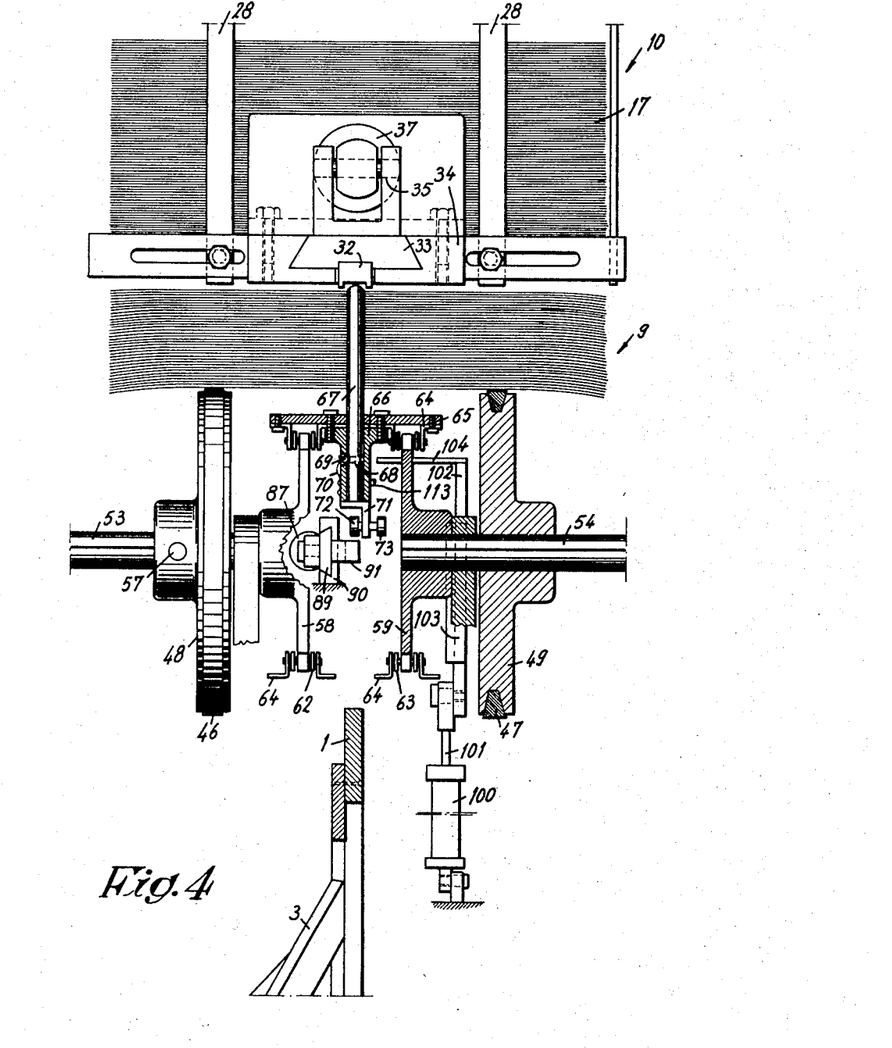
FIGURE 4 is a view and respectively a cross-section by a plane of which the trace follows the straight line IV—IV of FIGURE 3.

In this kind of embodiment, just as in the embodiment according to FIGURES 1 and 2, there is the bundle separator 1 in which the recess 2 is provided and which is fastened onto a swinging shaft 4 by means of an arm 3, while the counterpart 5 is mounted opposite separator 1. Moreover, a magazine 6, known as such, is provided on top of the bundle separator 1, which magazine is extended on top by the curved part 8 extended itself by a horizontal part of magazine 9 leading to, respectively connected with the main magazine 10 which in this case is also provided with an adjustable wall 11 for allowing a proper adjustment of aforesaid distance $a$ with respect to the distance between the carrier pins.

In this embodiment, the walls of the main reservoir 10 also consist of a pair of laths 28 and 29 respectively, while the outside wall of the curved part 8 and of the magazine 6 consists of a pair of laths 30 and the inner wall of magazine 6 of a pair of laths 31.

Figure 8:
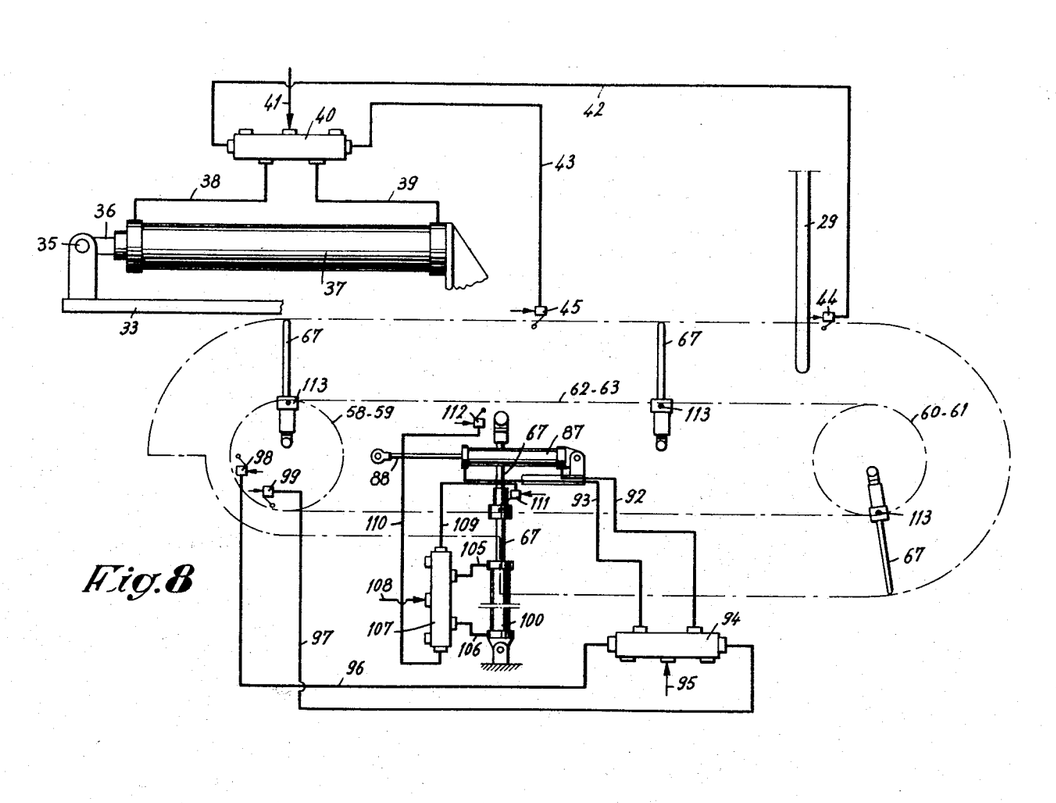
FIGURE 8 illustrates the pneumatic or hydraulic diagram of a device according to FIGURE 3.

The bottom of the main reservoir 10 is formed by a separator 32 connected with a dovetailed slider 33 mounted in an appropriate guiding lath 34. The end of said slider 33 is connected by a spindle 35 to the end of the piston rod 36 of a pneumatic pressure cylinder 37. The lattter is connected by pipes 38 and 39 to a relay valve 40 which in turn is connected to an appropriate source of compressed air by a pipe 41. On the other hand, said relay valve 40 is connected by pipes 42 and 43 to valves 44–45 respectively which can be acted upon by the carrier fingers described below.

In this embodiment, the lower wall of the magazine parts 8 and 9 consists of two V-belts, 46–47 respectively, running on a pair of grooved pulleys 48–49 and 50–51 respectively, whereby the upper parts of aforesaid V-belts 46 and 47 are supported in an appropriate way, by two laths 52.

Each of aforesaid grooved pulleys 48 to 51 is mounted on a shaft 53–54–55 and 56, respectively, in such way that they can slide along the latter and be rigidly connected to them by some appropriate means such as a clamping screw 57 for instance. In this way, it becomes possible to adjust the distance separating aforesaid V-belts 46 and 47 according to the length of the fibers to be supported.

Sprocket wheels 58–59–60 and 61, respectively, are mounted onto aforesaid shafts 53 to 56, whereby said sprocket wheels are connected in pairs by two chains 62 and 63 respectively. At regular distances apart, aforesaid chains 62 and 63 are provided with special links 64 at the location of which the chains in question 62–63 are connected to each other by a cross-piece 65 onto which a sleeve 66 is fastened between said chains.

This sleeve is provided with a central bore, coaxial with the bore provided in the cross-piece 65 through which a finger 67 can slide but not rotate. In order to make sure that the fingers can not rotate with respect to the sleeve 66, they may for instance be made square.

At a well determined place, a peripheral groove 68 is provided in the carrier fingers 67, which groove can cooperate with a ball 69 permanently loaded by a spring 70. The pins or carrier pins 67 are provided near their lower end with a supporting part 71 which, in this case, carries freely rotating rollers 72 and 73 respectively.

Figure 9:
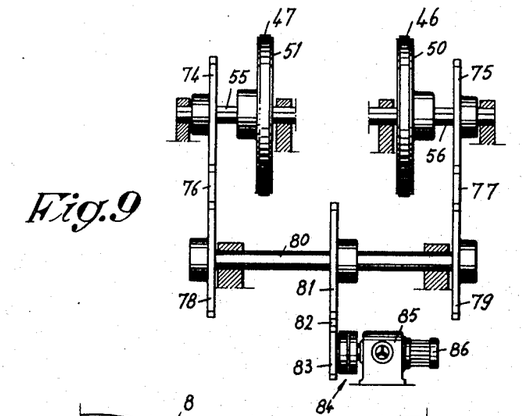
FIGURE 9 shows in a very diagrammatic way, the driving system according to FIGURES 3 to 8.

Aforesaid V-belts 46 and 47, together with the chains 62 and 63 are driven by aforesaid shafts 55 and 56. For this purpose the latter are provided with sprocket wheels 74 and 75, respectively, which, via the chains 76 and 77, are connected to sprocket wheels 78 and 79. The latter are fastened to a common shaft 80 onto which is fastened a sprocket wheel 81 connected by means of a chain 82 to another sprocket wheel 83 which in turn is fastened to one part of a friction clutch 84 of which the other part is connected to a speed regulator 85 of a motor 86.

Figure 5:
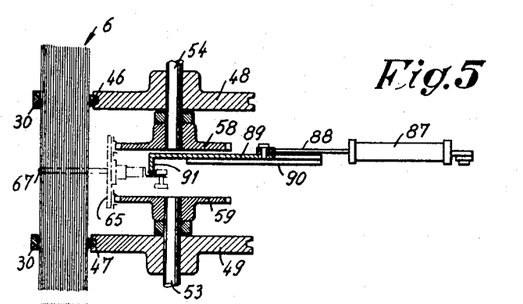
FIGURE 5 is a cross-section by a plane of which the trace follows the straight line V—V of FIGURE 3.

Onto the line X—X, which is the line where the fingers 87 must be pulled out of the fibre material, an air cylinder 87 is mounted and connected in an appropriate way to a fixed part of the device and of which the free end of the piston rod 88 is connected with a dovetailed slider 89 guided in a part 90. The free end of said slider 89 is connected with a right-angled part 91 which can cooperate with aforesaid rollers 72 provided on each one of the carrier fingers 67.

The compressed air cylinder 87 is, by means of appropriate pipes 92 and 93 respectively, connected to a relay valve 94 connected via pipe 95 to an appropriate source of compressed air and said relay valve 94 is connected by means of pipes 96 and 97 respectively to the valves 98 and 99 located in the trajectory of aforesaid fingers 67.

At a well determined location, a device is moreover provided for moving back the retracted fingers into the extended position. This device mainly consists of a compressed air cylinder 100 connected in an appropriate way with the frame and of which the free end of the piston rod 101 is connected with a dovetailed slider 102 mounted on a fixed guide 103. The free end of said slider 102 is provided with a part 104 fitted at right angles to it and which can successively cooperate with the rollers 73 provided on the lower end of each one of the carrier pins 67.

The compressed air cylinder 100 is connected by means of pipes 105 and 106 to a relay valve 107 which, by means of a pipe 108 is connected with aforesaid source of compressed air. Said relay valve 107 is further connected with valves 111 and 112 respectively by means of pipes 109 and 110.

Aforesaid valves 98–99–111 and 112 are all situated on the orbit of a little cam 113 provided on each one of the sleeves 66 for this purpose.

The operation of the device according to FIGURES 3 to 9 is also very simple and as follows:

In the description of this operation the starting point shall be chosen as illustrated in FIGURE 1.

The chains 62–63 as well as the belts 46 and 47 are permanently driven through the drive of aforesaid shafts 55 and 56, and this mainly as illustrated in FIGURE 9.

By means of this drive, said belts and chains move in the direction of arrow F in FIGURE 3 and it is assumed that the amount of fibre material contained in the magazines 6 and 8 is normally being used up.

The velocity of the chains 62 and 63 as well as of the belts 46 and 47 is adjusted according to this rate of production, which means that the pin 67A exerts a constant pressure on the fibre material, which is made possible by the presence of aforesaid friction clutch 84, considering that this latter will merely slip if an overpressure occurs.

Figure 6:
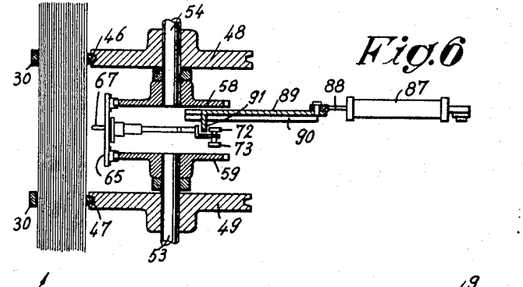
FIGURE 6 is a similar view to that of FIGURE 5, but in a second characteristic position.
Figure 7:
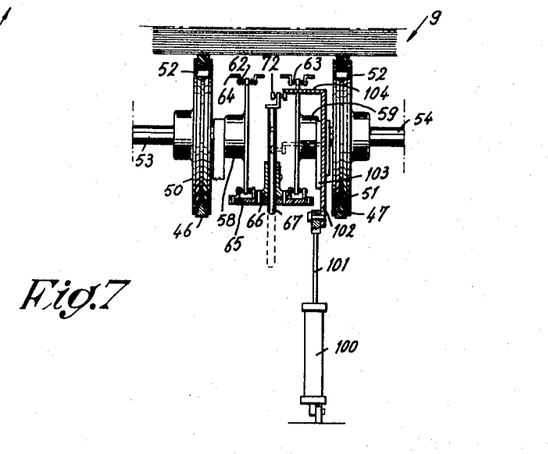
FIGURE 7 is a cross-section by a plane of which the trace follows the straight line VII—VII of FIGURE 3.

Together with the chains 62 and 63, the carrier pins 67A, 67B, 67C and 67D also move. When pin 67A reaches aforesaid line X—X, the roller 72 has arrived behind the cross-piece 91, whereby at this moment aforesaid little cam 113 acts on the valve 98 which causes the relay flap 88 to be switched over in such way that compressed air is led into the cylinder 87 through the pipe 93. It follows therefrom, that the piston rod 88 is pulled into the cylinder, which causes the roller 72 as well as the pin 67A to be moved backward via the slider 89 and the cross-piece 91, as illustrated in FIGURE 6. At this moment, said pin 67 has been entirely pulled out of magazine 6 and can pass freely over aforesaid bundle separator 1.

When pin 67A has been removed from the fibre material 7, the resistance which the driving motor 86 undergoes diminishes, which causes the friction clutch 84 to slip less, with the result that the fibre material which is being pushed forward by pin 67B is pushed forward at an accelerated rate until this fibre material comes into contact with the material remaining in magazine 6. At this moment, pin 67B undergoes once more a higher resistance, so that an even pressure is once again exerted on the fibre material by the presence of aforesaid friction clutch 84.

The carrier pin 67A which in the meantime has advanced pushes the valve 99 through aforesaid little cam 113, which acts on the relay flap 94 in such a way that air is added to the cylinder 87 through the pipe 92, of which the consequence is that aforesaid cross-piece 91 resumes its initial position, i.e., the position as illustrated diagrammatically in FIGURE 5. Hence, aforesaid cross-piece 91 is now ready to retract the following pin which in this case is pin 67B.

As shown in FIGURE 3, pin 67D is in the retracted position, so that it must be once more pushed out in order to be able to fulfill its purpose, which is to push the fibre material forward, during the further course of the cycle. This takes place through the fact that aforesaid little cam 113 depresses the valve 111. At this moment, aforesaid roller 73 is situated under the crosspiece 104 which is connected with the piston rod 101 of the pressure cylinder 100 via the slider 102. By operation of the valve 101, compressed air is admitted into cylinder 100 by the pipe 105, whereby the cross-piece 104 is pulled downward. The result is that said cross-piece 104 acts onto aforesaid roller 73 and hence on the corresponding pin 67 which therefore is brought back into initial position, respectively its operating position.

Already before that, aforesaid pin 67 has depressed valve 45 so that the relay flap 40 is acted upon in such way that compressed air is admitted to air cylinder 37 via the pipe 39, with the result that the separator 32 is pulled out of the main magazine 10, which causes the fibre material 17 to come down under the influence of an even pressure exerted on it either by a weight or by a pneumatic or hydraulic device or the like, right onto the conveyor belts 46–47 which are supported by the laths 52.

Pin 67C will subsequently act upon the valve 44, so that the relay flap 40 switches over and supplies compressed air to the cylinder 37 through the pipe 38, which has the effect that the separator 32 penetrates once more into the magazine 10 and splits the fibre material 17 into the amount which temporarily remains in the main reservoir and the amount which will be moved by the pin 67C.

Finally, when the pin 67B comes past the spot where the compressed air cylinder 100 is mounted, the corresponding cam 113 acts on the valve 112 so that, through the pipe 106, compressed air is supplied to the compressed air cylinder 100 in such way that the latter resumes its original, respectively highest position. It is obvious that this operation is delayed until the approaching pin has passed the device 100 to 104.

The cycle which has been described above is automatically repeated, whereby the pins 67A to 67D successively act on the various valves 44–45–98–99–111 and 112, without need for any supervision. It is only necessary to refill at given times the main magazine 10 with horizontally arranged fibres. Considering that said magazine 10 is not limited in height, the amount of fibre material 17 can be determined in such way that the machine provides a maximum production rate, so for instance that the amount of fibre material 17 which is supplied into said magazine 10 is sufficient for letting the machine operate a whole day without need for any intervention.

Figure 10:
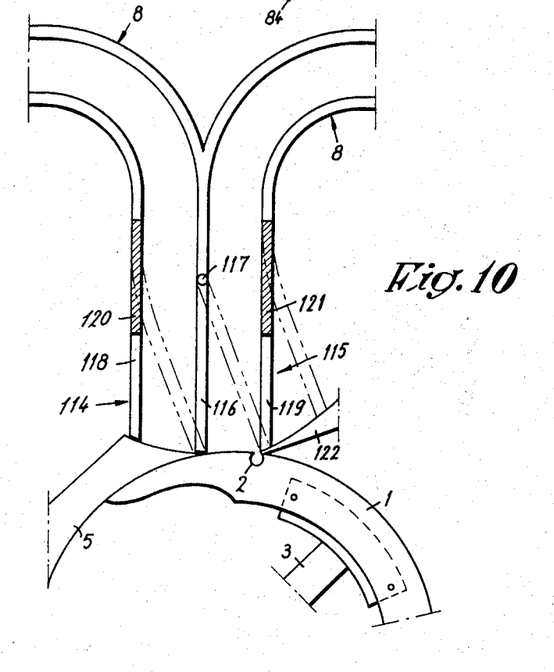
FIGURE 10 illustrates diagrammatically the way in which the device according to the present invention can be applied onto machines capable of processing different kinds of fibres.

Finally, FIGURE 10 illustrates an additional device which mainly consists of a double magazine 114–115 respectively, in which are put two different fibres. It is obvious that each of such magazines 114 and 115 which can separately be compared with aforesaid magazine 6, will be connected to a device according to FIGURE 1 or to FIGURE 3. In this case, said magazines 114–115 are for instance separated from each other by a partition 116 which is hinged by means of a hinge 117 to the remainder of aforesaid magazines, whereby the outer walls of the latter, 118 and 119, respectively, are provided with a part, 120 and 121, respectively, which is flexible so that the walls 118 and 119 can readily follow the displacement of the partition 116. In this case, a support 122 is provided above the bundle separator 1 for supporting the fibres of magazine 115 when fibres are being used from magazine 114.

Such device will prove to be of very practical use when alternately two kinds of fibers must be used, for instance when two kinds of fibres must alternately be fitted into place for satisfying for instance a given pattern on a brush body.

When operating with certain kinds of fibres, the latter may have to undergo some cleaning process before being fitted into place. Such cleaning process could very efficiently be carried out during the transportation of the fibres on aforesaid V-belts 46 and 57. With this object in view, it might for instance be particularly convenient to fit combs and beaters on both sides of the fibres in the manner which is usually applied in separate cleaning machines.

In the examples of FIGURES 1 to 9, the chains are subdivided into four equal parts by the fingers 26–27 and, 67, respectively. Nothing prevents however to apply more or less fingers on the chains in order to obtain more or less equal parts.

Figure 11:
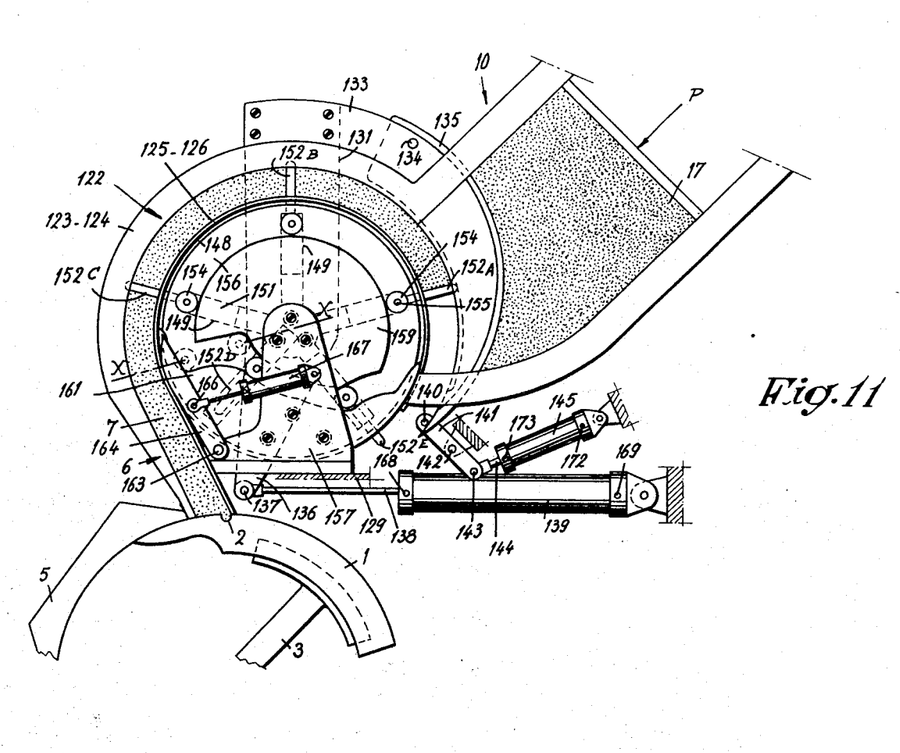
FIGURE 11 shows in a side-view a variant of the form of embodiment according to FIGURES 1 to 10.
Figure 12:
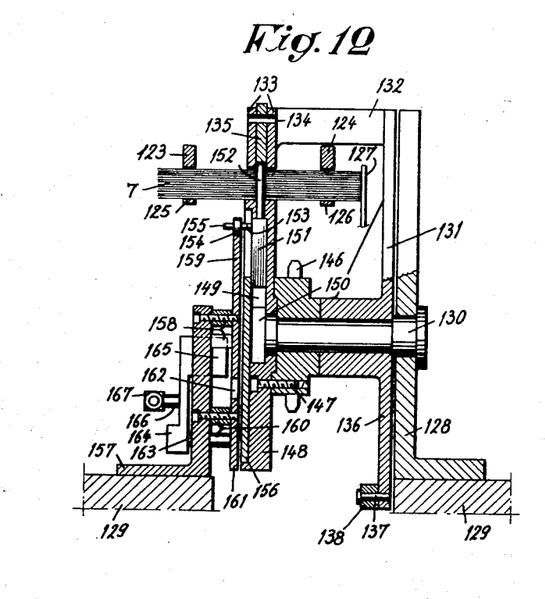
FIGURE 12 is an almost vertical cross-section through the center point of the device according to FIGURE 11.
Figure 13:
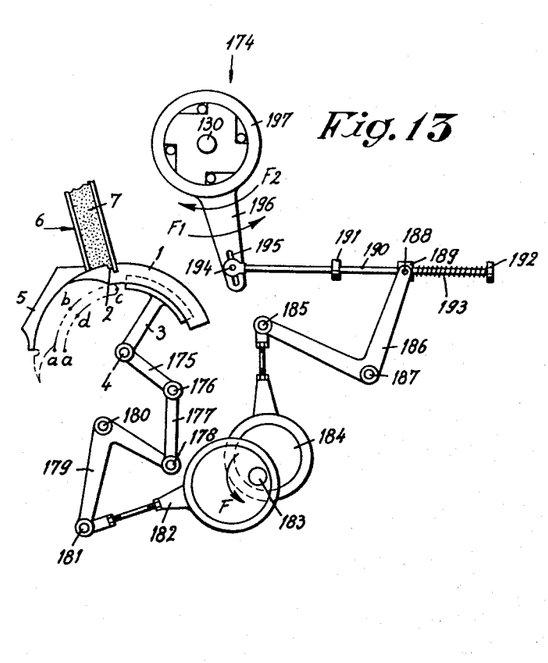
FIGURE 13 shows an example of driving mechanism of the device according to FIGURES 11 and 12.

In the embodiment according to FIGURES 11 to 13, a variant is represented which has been specially designed with the object of taking comparatively little room, whereby with this purpose in view the carrying fingers or pins are mounted on a cylindrical disc.

In this form of embodiment there is also a magazine 6 mounted above the bundle separator 1, in which magazine there are fibres 7 which are placed parallel with aforesaid driving shaft 4 of the bundle separator 1, while aforesaid magazine 6 is extended by a circular magazine 122 of which a given part leads to the underside of the main magazine 10. The latter is filled with a supply of fibres 17 which represents for instance the capacity for a full day's operation with the fibre processing machine fed by the bundle separator 1.

In this embodiment, the main magazine 10 is fitted slantingly in order to limit somewhat the height thereof. Nothing prevents however placing this main magazine either horizontally or vertically.

The outer walls of the magazines 6–122 and 10 are made of laths 123 and 124, respectively, which can be mutually adjusted, while the bottom walls of the magazines 6 and 122 are made of laths, 125 and 126, respectively. Finally, the bottom edge of the main magazine also consists of two parallel laths.

The adjustment of the mutual distance of aforesaid laths forming the magazines 6–122 and 10 is necessary for processing fibres of different lengths.

Beside aforesaid magazine, there is moreover provided an adjustment plate 127 of which the location also depends on the length of the fibres to be processed.

Further, the installation according to the present invention mainly consists of a bracket 128 which is fastened to the frame 129 of the machine, whereby a trunion 130 is solidly fastened to this bracket. A lever 131 can freely rotate about said trunion 130, which lever is provided near the top with a transverse part 132 onto which a twin-fibre distributor 133 is fastened.

The bottom part of the latter is made cylinderical while the upper part is made as a spiral in order that the free end of said fibre separator should terminate in a point.

The twin-fibre separator 133 is connected by means of a spindle 134 with a so called lifting handle 135 which reaches somewhat beyond the end of the actual fibre separator.

Aforesaid lever 131 is extended downward by a part 136 of which the free end is connected via a spindle 137 to the free end of a piston rod 138 of a pneumatic jack 139 hinged to the frame.

In the position illustrated in FIGURE 11, the free end of aforesaid lifting handle 135 is in contact with a pin 140 which projects from a lever 141, which lever can swivel around a pivot 142. The other free end of said lever 141 is connected by means of a spindle 143 to the free end of the piston rod 144 of a second pneumatic cylinder 145 which also is hinged to the frame of the machine.

Further, on aforesaid trunion 130 is mounted, also free to rotate, a sprocket wheel 146 which is fastened by means of screws 147 to a cylindrical revolving disc 148.

The latter is provided with radial grooves 149, in the present case, five, whereby said grooves lead to the center of the rotary disc into a cylindrical space 150.

In each one of said grooves 149, there is a slider 151, whereby said sliders are each provided toward their free outer end with a finger or carrying pin 153 which passes through an appropriate opening provided in the outer wall of the rotary disc 148.

Each one of said sliders 151 is provided with a fixed axis 153 onto which a little roller 154 can freely rotate. This axis 153 is moreover extended past said roller 154 in order to make a protruding little pin or tap 155.

Finally, the various sliders 151 are kept in their respective grooves by a covering plate 156 in which radial grooves are provided as passages for the corresponding axes 153.

The frame 129 further carries a second fixed support 157 onto which, by means of intermediate parts 158, an upper cam 159 is fastened, while, via other intermediate parts 160, a lower cam 161 is fastened onto said support 157. These cams are shaped in such a manner that between them a cam groove 162 is formed of which the width fits the diameter of aforesaid rollers 154 which run on the cams 159 and 161.

Furthermore, a pin 163 is provided on said support 157, about which pin a lever 164 is hinged. This lever is provided near the other free end with a lateral projection 165 of which the length is determined in such way that it can cooperate with aforesaid axis ends or pivots 155 which bear the running rollers 154, while the width of this projection 165 is determined according to the width of aforesaid cam groove 162.

Finally, lever 164 is fitted near the middle with a spindle 166 which is hinged to the free end of the piston rod of a pneumatic jack 167.

The operation of this installation as illustrated in FIGURES 11 and 12 is very simple and as follows: aforesaid sprocket wheel 146 is permanently driven, via a friction clutch, by a geared motor, so that the rotary disc 148 as well as the finger 152 revolve at a constant speed.

As illustrated in FIGURE 11, the pins 152 push the fibre material forward so that, depending on the diminishing amount of fibre material, aforesaid friction clutch will slip to a varying degree, so that the fibre material in magazine 6 will always be subjected to a constant pressure.

At a given moment, the pin of carrier finger 152A will depress a valve controlling a relay valve which through the pipe 168, admits compressed air into the cylinder 139, so that the lever 131 is being rotated. On account of this rotation, the result is produced that the fibre separator 133 is pulled out of magazine 10, so that the fibre material 17 which is subjected to a slight pressure P drops right down onto aforesaid rotary disc 148.

Subsequently, the pin on carrying finger 152E depresses a valve which also controls aforesaid relay valve, and this in such way that, through the pipe 169, compressed air is supplied to aforesaid cylinder 139 so that the fibre separator 133 penetrates once more into the main magazine and separates the fibres of this magazine from those which have dropped into magazine 122.

When the fibre separtor 133 and hence the lifting handle 135 have reached the position as illustrated in FIGURE 11, the point of said lifting handle 135 is situated under aforesaid pin 140. At this moment, one of the fingers 152 controls a third valve which, in turn, controls a second relay valve, whereby the latter supplies compressed air to aforesaid pressure cylinder 145, and this through a pipe 172.

The result is that the lifting handle 135 revolves about the pivoting point 134, so that fibres which might have become entangled are released.

Said lifting handle 135 subsequently stays in its highest position almost until the moment when the following separation must take place, whereby at that very moment, compressed air is supplied to aforesaid cylinder 145 through the pipe 173.

When, in the position as illustrated in FIGURE 11, the pin 152C takes up the position indicated by X—X, this pin will be pulled out of the fibre material.

At that moment, an appropriate valve is being controlled which, via a relay valve, supplies compressed air for the piston of cylinder 167 so that the lever 164 is being swung toward the center of the revolving discs 148.

When in this position, said lever acts with projection 165 onto the pivot or little trunion 155 which is fastened to the slider 151 of pin 152C, whereby the corresponding roller 154 is pressed into aforesaid cam groove 162 and presses the latter toward the center of aforesaid revolving disc 148. As a result, the pin 152C is pulled out of the fibre material.

The little roller subsequently follows aforesaid cam groove 162, so that the corresponding pin, at the appropriate moment, is once more pressed out of aforesaid revolving disc 148 by the joint action of aforesaid cams 159 and 161.

Another valve is provided in order that subsequently compressed air is supplied behind the piston of cylinder 167, so that the lever 164 once more takes up the position as illustrated in FIGURE 11.

It is obvious that, for a back motion of aforesaid lever 164, use could also be made of a single-action pressure cylinder 167 whereby, in that particular case, a spring shall be provided between the rear end of aforesaid pressure cylinder and the corresponding piston.

FIGURE 13 illustrates a second possibility for driving aforesaid revolving disc 148, in which case aforesaid sprocket wheel 146 shall be replaced in an appropriate way by a free-wheel clutch 174.

It is known that the bundle separator 1 always follows successively the motion a–b–c–d–a, whereby in this case this motion is obtained by aforesaid lever 3 which is fastened onto the shaft 4 and whereby a lever 175 is fastened onto this shaft, so that said lever is connected through a spindle 176 to an intermediate rod 177, whereby this latter, through a spindle 178, is hinged to a curved lever 179 which, in turn, is mounted on an axis 180.

The free end of the second part of aforesaid curved lever 180 is hinged onto a pivot 181 onto which is also mounted the adjustable end of a connecting rod 182 which, in turn, is mounted excentrically on a shaft 183 on bearings which forms the main driving shaft of the installation.

On aforesaid shaft 183, a connecting rod 184 is also fastened excentrically, of which the adjustable free end is mounted on a pivot 185 and whereby a curved lever 186 is hinged to the latter. The latter is fastened for free rotation on a shaft 187 on bearings.

Finally, the free end of the curved lever 186 is hingedly connected via a pivot 188 with a sliding block 189 which can slide on a rod 190. The later is provided at predetermined places with stops 191 and 192, respectively, with a coiled spring 193 provided between aforesaid sliding block 189 and the stop 192.

The free end of aforesaid rod 190 is connected through a spindle 195 mounted in a groove 195 to an arm 196 which, in turn, is connected to the outside part 197 of aforesaid free-wheel clutch 174.

The operation of the device according to FIGURES 11 and 12, when it is being driven via the installation according to FIGURE 13, is quite simple and as follows:

The main shaft 183 rotates permanently in the direction indicated by arrow F.

Starting from the position according to FIGURE 13, when the shaft 183 is being rotated, the bundle separator will be displaced from position c to d, whereby during this displacement, a pressure must be exerted on the fibres 7. This is obtained through the fact that during this rotation the lever 196 will rotate according to arrow $F_1$, so that the revolving disc 148 and also the fingers 152 are being driven with the result that, on the one hand, a pressure is being exerted on the fibres and, on the other hand, the latter are conveyed further.

On further rotation of shaft 183, the bundle separator moves from d to a, whereby during this displacement it is not necessary that a pressure be exerted on the fibres 7. Subsequently, the fibre separator moves from a to b, during which motion no pressure need be exerted on the fibres 7 either, and finally the bundle separator 1 moves from position b to c, displacement during which it is necessary that a pressure be exerted on the fibres 7, so that the lever 196 moves once again in the direction of arrow $F_1$.

Hence, the displacement of the bundle separator along the path b–c–d will necessarily be accompanied by the rotation of lever 196 according to arrow $F_1$, whereas the displacement d–a–b of this bundle separator 1 will occur during the motion of lever 196 in the direction of arrow $F_2$.

During the latter displacement aforesaid free-wheel clutch 174 runs free so that the revolving disc 148 is not being driven.

Aforesaid stops 191 and 192 as well as the spring 193 have been provided for preventing the driving elements from breaking or being distorted if it should happen that the pressure on the fibres would become too strong. In fact, in such case, lever 186 moves against the pressure of spring 193 without the arm of lever 196 having to move.

By choosing either a stronger or a weaker spring 193, the maximum pressure on the fibres can of course be increased or reduced.

It is obvious that for driving aforesaid revolving disc 148, respectively, for driving the fingers 152, any suitable equivalent permanent or stepwise drive can be chosen without exceeding the scope of the present invention.

The examples which have been described above apply more specially to the processing of comparatively heavy fibres such as those of which brooms are made. It is obvious that aforesaid installation must be adapted to the kind of fibres to be processed.

The present invention is in no way limited to the embodiments which have been described above and illustrated by the appended drawings, but can assume any shapes and sizes without exceeding the scope of the present invention.

What I claim is:

1. Installation for the supply of fibres, comprising a main magazine of which at least one wall is adjustable and of which the bottom consists of a removable fibre separator; below aforesaid main magazine a substantially horizontal discharge magazine having a curved part, another magazine connected with said curved part, a bundle separator connected with the last-mentioned magazine, at least two belts constituting the bottoms of said discharge magazine and said curved part, pulleys carrying said belts, separate shafts connected with said pulleys, a separate sprocket wheel upon each of said shafts, two sprocket wheels connected to each other by means of chains interconnecting said sprocket wheels, retractable fingers, means on said chains carrying said fingers, means removing said fingers from said discharge magazine, means bringing the retracted fingers back into the extended position and means controlling aforesaid separator.

2. Installation according to claim 1, comprising a jack having a piston rod, said separator having an extension connected to the free end of said piston rod.

3. Installation according to claim 2, wherein said fingers which are provided onto the driving chains are mounted between aforesaid displaceable parts of the bottom of the discharge magazine between aforesaid belts, and whereby said fingers lie exactly in the plane of the bundle separator and exactly in the middle of the length of the fibres to be displaced.

4. Installation according to claim 3, comprising a sleeve, each of said fingers being mounted in said sleeve in which it can slide but not rotate, a bridge, said sleeve being mounted on said bridge, and links connecting said bridge to said chains.

5. Installation according to claim 4, wherein said fingers are provided with circumferential grooves, a separate spring-loaded ball which in a defined position cooperates with a groove of each finger to lock that finger in said position.

6. Installation according to claim 5, wherein each of said fingers comprises at least one free roller.

7. Installation according to claim 6, wherein the length of the carrier fingers is such that the free ends thereof lie flush with the inner face of the upper wall of the discharge magazine.

8. Installation according to claim 1, wherein aforesaid pulleys are mounted and fastened onto their respective shafts so as to be able to slide thereon.

9. Installation according to claim 1, wherein said belts are V-belts, characterized by the fact that aforesaid belts are V-belts.

10. Installation according to claim 1, comprising supporting laths mounted below the belt parts which form the bottom of aforesaid discharge magazine.

11. Installation according to claim 1, characterized by the fact that the means by means of which aforesaid pins can be pulled out of the fibre material consist of a jack having a piston rod, and an extension having on its free end a cross-piece which can act behind aforesaid roller mounted on the free end of the carrier fingers, said piston rod being connected with said extension.

12. Installation according to claim 1, wherein the means which bring aforesaid fingers back into their extended position, consist of a jack having a piston rod provided with an extension, said extension having at its free end a cross-piece which can act on aforesaid roller mounted on the end of the carrier fingers.

13. Installation according to claim 11 comprising a motor with speed variator and a friction clutch provided between the speed variator and the mechanical transmission to the driving shafts of aforesaid pulleys and sprocket wheels for driving said chains.

14. Installation according to claim 13, wherein aforesaid jacks are controlled pneumatically.

15. Installation according to claim 13, wherein aforesaid jacks are controlled hydraulically.

16. Installation according to claim 15 comprising conduits connected to said jacks near each end thereof, a separate relay valve connected to each conduit, a source of compressed air connected to each valves, valves controlled by the mobile fingers, said relay valves being connected with the last-mentioned valves in order to automatically control the various operations by mere advance of aforesaid fingers.

17. Installation according to claim 16, comprising combs and beaters mounted on either side of the fibres with object of cleaning the latter while they are being conveyed to aforesaid bundle separator.

18. Installation according to claim 9, comprising a double magazine mounted above a single bundle separator.

19. Installation according to claim 18, wherein the lower part of the magazine leading to aforesaid bundle separator is hinged in order to move either one or the other magazine above the bundle separator, and a retainer for the second magazine.

20. Installation for the supply of fibres, comprising a main magazine having a bottom formed by a retractable fibre separator; a cylindrically curved discharge magazine, another magazine connected with said discharge magazine, a bundle separator connected with said other magazine, whereby the bottom of aforesaid discharge magazine consists of at least two curved lathes, a cylindrical disc, carrier fingers carried by said disc, means for removing aforesaid fingers from aforesaid discharge magazine; means to bring the retracted fingers into the extended position; means to drive aforesaid cylindrical disc, and means which control aforesaid separator.

21. Installation according to claim 20, comprising a lever, a jack having a piston rod, said cylindrical fibre separator being mounted upon a free end of said lever, said lever having another free end connected with said piston rod of the jack.

22. Installation according to claim 21, comprising a lifting handle, the fibre separator being hinged to said lifting handle which, after actual separation of the fibres, can be separately lifted.

23. Installation according to claim 20, said cylindrical disc which carries the carrier fingers is mounted above the bundle separator, so that these fingers are situated in the same plane as said bundle separator.

24. Installation according to claim 20, comprising a slider, each of said fingers being connected with said slider which can be displaced in a radial groove of aforesaid cylindrical disc.

25. Installation according to claim 24, comprising a small protruding axle carried by each slider, and a separate roller carried by each axle, said axles protruding beyond said rollers.

26. Installation according to claim 25, wherein the means which remove said fingers from the fibre material and bring them into the extended position, consist of a cam which cooperates with aforesaid rollers of each one of said fingers.

27. Installation according to claim 26, comprising an additional lever acting on the protruding axles of the carrier finger rollers in order to pull said fingers by a straight motion out of the fibre material, and a jack controlling said additional lever.

28. Installation according to claim 27, comprising a gear wheel, a friction clutch driving said gear wheel and a geared motor driven by said friction clutch, the cylindrical disc carrying the carrier fingers being connected with said gear wheel.

29. Installation according to claim 27, comprising a free-wheel clutch, a system of levers connected with said clutch, a main shaft driving said system of levers, said cylindrical disc being connected with said clutch, and a second system of levers connected with said bundle separator and driven by said main clutch.

30. Installation according to claim 29, wherein the free-wheel clutch drives the cylindrical disc and the carrier fingers when the recess of the bundle separator moves under the fibre magazine.

31. Installation for the automatic supply of fibres to fibre material processing machines, comprising in combination, a main magazine adapted to contain a substantial amount of fibres, a discharging magazine connected to the lowest part of the main magazine, another magazine, a bundle separator, the last-mentioned magazine being connected to said bundle separator and said discharging magazine, means which convey successively smaller masses of fibres from the main magazine to the bundle separator, said means comprising fingers, an endless conveyor system, said fingers being fastened at equal intervals upon said conveyor system, the lengths of said fingers being at least equal to the height of said discharging magazine, a bridge, and at least one endless chain connected with said bridge, said fingers being mounted in pairs on said bridge.

32. Installation in accordance with claim 31, wherein the distance between each pair of said fingers is larger than the thickness of said bundle separator.

References Cited

UNITED STATES PATENTS

| | | | |
|---|---|---|---|
| 1,016,951 | 2/1912 | Mumford | 300—5 |
| 2,607,629 | 8/1952 | Febvre | 300—7 |
| 3,059,972 | 10/1962 | Schmidt | 300—5 |
| 3,260,549 | 7/1966 | Guey et al. | 300—5 |

STANLEY H. TOLLBERG, *Primary Examiner.*

U.S. Cl. X.R.

221—251; 300—5